United States Patent [19]

Suzuki

[11] Patent Number: 4,889,669
[45] Date of Patent: Dec. 26, 1989

[54] PROCESS FOR PRODUCING FOAMED THERMOPLASTIC RESIN ARTICLES

[75] Inventor: Yasuyosi Suzuki, Mie, Japan

[73] Assignee: Mitsubishi Petrochemical Co., Ltd., Tokyo, Japan

[21] Appl. No.: 169,878

[22] Filed: Mar. 18, 1988

[30] Foreign Application Priority Data

Apr. 10, 1987 [JP] Japan .................................. 62-87003

[51] Int. Cl.[4] ........................ B29C 67/22; B29C 47/06
[52] U.S. Cl. .................................. 264/45.9; 264/171; 264/211; 425/131.1; 425/817 C
[58] Field of Search ...................... 264/45.9, 46.1, 171, 264/211; 425/131.1, 817 C

[56] References Cited

U.S. PATENT DOCUMENTS

| | | | |
|---|---|---|---|
| 3,331,900 | 7/1967 | Thomas | 264/45.9 X |
| 3,411,981 | 11/1968 | Thomas | 264/45.9 X |
| 3,668,288 | 6/1972 | Takahashi | 264/46.1 |
| 3,855,376 | 12/1974 | Ono et al. | 264/46.1 |
| 4,101,050 | 7/1978 | Buckler et al. | 264/45.9 X |
| 4,107,247 | 8/1978 | Dukess | 264/45.9 |
| 4,221,624 | 9/1980 | Eslinger et al. | 264/45.9 X |

FOREIGN PATENT DOCUMENTS

| | | |
|---|---|---|
| 948820 | 6/1974 | Canada . |
| 0084360 | 7/1983 | European Pat. Off. . |
| 1779874 | 12/1971 | Fed. Rep. of Germany . |
| 48-25068 | 4/1973 | Japan . |
| 54-65771 | 5/1979 | Japan . |

Primary Examiner—Philip Anderson
Attorney, Agent, or Firm—Oblon, Spivak, McClelland, Maier & Neustadt

[57] ABSTRACT

A process for producing a foamed thermoplastic resin article is disclosed, comprising separately melt kneading the first thermoplastic resin composition comprising a first thermoplastic resin and 10 to 400 parts by weight per 100 parts by weight of the first thermoplastic resin of a filler and constituting an unfoamed layer at the time of extrusion molding, and the second thermoplastic resin composition comprising a second thermoplastic resin and a foaming agent and constituting a foamed layer at the time of extrusion molding, by the use of extruders, and extruding the two resin compositions in the form of laminate through a T die.

13 Claims, 2 Drawing Sheets

PROCESS FOR PRODUCING FOAMED THERMOPLASTIC RESIN ARTICLES

FIELD OF THE INVENTION

The present invention relates to a process for producing foamed thermoplastic resin articles, which prevents articles from wave-like deformation resulting from expansion produced in a width direction at right angles to the extrusion direction in extrusion molding of foamed thermoplastic resin articles (hereinafter referred to as "foamed articles") by the use of a T die and further which efficiently realizes the desired expansion ratio.

BACKGROUND OF THE INVENTION

In extrusion under atmospheric pressure of foamable resin compositions by the use of a slit die such as a T die, it expands in three directions. In this case, the expansion in an extrusion direction of the foamed article is not subject to any limitation, whereas the expansion in the thickness direction and in the width direction is limited by an outlet of the T die, leading to the deformation of the foamed article in a wave form. This phenomenon is called a "corrugation phenomenon". Of these deformations, the deformation in the molding direction due to the limitation in the thickness direction can be prevented by controlling the pulling speed of the foamed article. However, the deformation in the width direction due to the limitation in the width direction cannot be prevented. This phenomenon tends to become more marked as the expansion ratio is increased and also as the clearance of the die slit is decreased.

When the foamed article is cooled by contacting with a roll, for example, if the corrugation occurs, the foamed article comes into contact with the roll unevenly and thus streaks parallel to one another in the molding direction are developed, markedly reducing the appearance of the foamed article.

To overcome the above problems, a method using a circular die has heretofore been known. In accordance with this method, however, a plate-shaped foamed article cannot be obtained unless the resulting circular foamed article is cut and opened. This additional step makes the process complicated and further wrinkles are produced at the time of cutting. Thus the above method is not effective to overcome the problems. Another method proposed to overcome the above problems is to produce a smooth foamed article by the use of a sizing die having various forms, as disclosed in Japanese Laid-Open Patent Application Nos. 25068/73 and 65771/79. This method, however, is also not effective because it has disadvantages in that a special apparatus is needed and thus the method is unsuitable for practical use, and the method is difficult to apply to a foamed article small in thickness.

SUMMARY OF THE INVENTION

The present invention is intended to overcome the above problems, and an object of the present invention is to provide a method whereby the corrugation can be effectively prevented without use of a special apparatus, and a foamed thermoplastic resin article having a smooth surface and a good appearance, a high specific modulus and a high flexural stress, and further a high expansion ratio can be produced.

The present invention relates to a process for producing a foamed thermoplastic resin article which comprises separately melt kneading the first thermoplastic resin composition comprising a first thermoplastic resin and 10 to 400 parts by weight per 100 parts by weight of the first thermoplastic resin of a filler and constituting an unfoamed (or non-foamable) layer at the time of extrusion molding, and the second thermoplastic resin composition comprising a second thermoplastic resin and a foaming agent and constituting a foamed layer at the time of extrusion molding, by the use of extruders, and extruding the two resin compositions in the form of laminate through a T die.

BRIEF DESCRIPTION OF THE DRAWINGS

A more complete appreciation of the invention and many of the attendant advantages thereof will be easily obtained as the same become better understood by reference to the following detailed description when considered in connection with the accompanying drawings, wherein.

DETAILED DESCRIPTION OF THE INVENTION

Figure 1A:
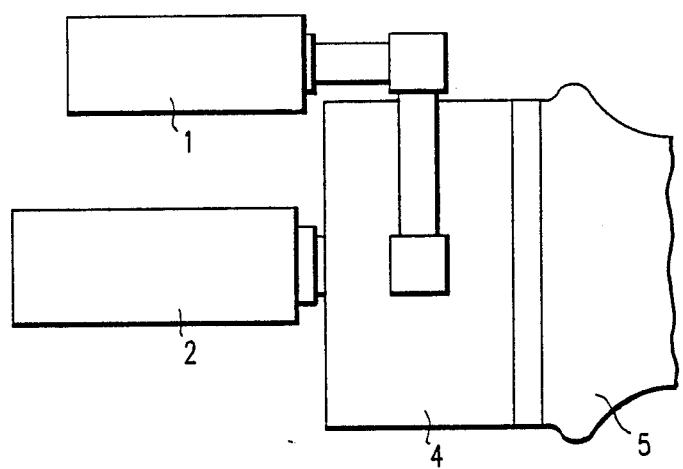
FIGS. 1a and 1b represent an apparatus for extrusion molding while forming a laminate in a T die.

The first thermoplastic resin as used herein includes polyolefin resins (e.g., low density, medium density, and high density polyethylenes, linear low density polyethylene, polypropylene, copolymers of ethylene or propylene with other α-olefins, and copolymers of ethylene with vinyl acetate, acrylic acid, methacrylic acid, acrylic acid esters, methacrylic acid esters, vinyl alcohol and the like), polystyrene resins, ABS resins, AS resins, polyvinyl chloride resins, polymethyl acrylate resins, polymethyl methacrylate resins, polycarbonate resins, polyamide resins, polyphenylene oxide resins, their mixtures and the like. Preferred examples of the first thermoplastic resins are polyolefin resins, with a polypropylene resin and a high density polyethylene resin being more preferred. Other preferred examples of the first thermoplastic resins are styrene-series resins, with a polystyrene resin and an ABS resin being more preferred.

The filler as used herein includes calcium carbonate, magnesium carbonate, calcium hydroxide, magnesium hydroxide, aluminum hydroxide, aluminum phosphate, talc, mica, clay, carbon black, white carbon, graphite, zeolite, barium sulfate, water-containing calcium silicate and the like as inorganic powders, a phenol resin powder, an ebonite powder, a woodmeal, a rice hull powder and the like as organic powders, and as fibers, glass fibers, pulp fibers, asbestos fibers, polyethylene terephthalate fibers, polyamide fibers and the like, with talc, mica and calcium carbonate being preferred.

The amount of the filler compounded is 10 to 400 parts by weight per 100 parts by weight of the first thermoplastic resin. If the amount of the filler compounded is less than 10 parts by weight, the effect of preventing the foamed article from wave-like deformation is poor, whereas if it is in excess of 400 parts by weight, extrusion molding in the form of laminate becomes difficult.

In addition, an antioxidant, a coloring agent, an ultraviolet absorbent, an antistatic agent, a plasticizer, a slipping agent such as fatty acid metal salts and fatty acid amides, and the like can be added, if necessary.

As the second thermoplastic resin, the same as used in the first thermoplastic resin can be used. Preferred examples of the second thermoplastic resins are polyolefin resins, with a polypropylene resin and a high density polyethylene resin being more preferred. Other preferred examples of the second thermoplastic resins are styrene-series resins, with a polystyrene resin and an ABS resin being more preferred.

It is preferred that a filler is not substantially added to the second thermoplastic resin. This is because addition of the filler facilitates the removal of foams at the time of foaming and reduces foaming characteristics. It is not obstructed that the filler is added to the second thermoplastic resin and the same filler as used in the first thermoplastic resin composition can be added. However it is necessary for the amount of the filler added to be smaller than that compounded to the first thermoplastic resin. The amount of the filler added is preferably 20 to 50 parts by weight per 100 parts by weight of the second thermoplastic resin.

As the foaming agent, both a chemical foaming agent and a physical foaming can be used. Examples of the chemical foaming agent include azodicarbonamide, azobisisobutyronitrile, diazoaminobenzene, N,N'-dinitrosopentamethylenetetramine, N,N'-dimethyl-N,N'-dinitroterephthalamide, benzenesulfonylhydrazide, p-toluenesulfonylhydrazide, p,p'-oxybisbenzenesulfonylhydrazide, carbonic acid salts such as sodium hydrogencarbonate, organic acid salts such as an alkali metal citrate and the like. Examples of the physical foaming agent include propane, butane, pentane, dichlorodifluoromethane, dichloromonofluromethane, trichloromonofluoromethane, methanol, ethanol and the like. Preferred examples of the foaming agents are an alkali metal citrate, a mixture of an alkali metal citrate and sodium hydrogencarbonate, and azodicarbonamide. If necessary, these foaming agents can be used in combination with an auxiliary foaming agent, a crosslinking agent and a nucleating agent which are commonly used. Moreover the foamed article may be crosslinked.

The foamed article of the present invention is basically of the two or three layer structure, comprising the layer of the second thermoplastic resin composition and the layer(s) of the first thermoplastic resin composition(s) laminated on one or both surface(s) of the layer of the second thermoplastic resin composition. The corrugation can be sufficiently prevented by laminating the layer of the first thermoplastic resin composition on one surface of the layer of the second thermoplastic resin composition. In this case, it is preferred that the thickness of the layer of the first thermoplastic resin composition be made somewhat greater than that in case of the laminate comprising the layer of the second thermoplastic resin composition and the layers of the first thermoplastic resin compositions laminated on both surfaces of the layer of the second thermoplastic resin composition.

In case where the adhesion between the layers of the first and second thermoplastic resin compositions is insufficiently low depending on a combination of the first and second thermoplastic resins, a suitable adhesive layer may be provided between the layers of the first and second thermoplastic resin composition.

The thickness of each layer varies with the combinations of the type of the first thermoplastic resin, the type of the filler and the concentration of the filler, and further the type of the second thermoplastic resin and the expansion ratio. When, however, the thickness of the layer of the first thermoplastic resin composition is too small, the corrugation is sometimes prevented only insufficiently. Thus, usually, the thickness ratio of unfoamed layer is preferred to be about 0.05/1 to 0.7/1 based on the total thickness.

In connection with a lamination method, the first and second thermoplastic resin compositions are laminated in a molten state prior to the extrusion through a T die. In general, a multi-manifold method in which the first and second thermoplastic resin compositions are melt kneaded in the respective extruders and then laminated in a T die, a feed block method (combining adapter method) in which lamination is carried out prior to introduction into the T die, and so forth can be employed.

Figure 1B:
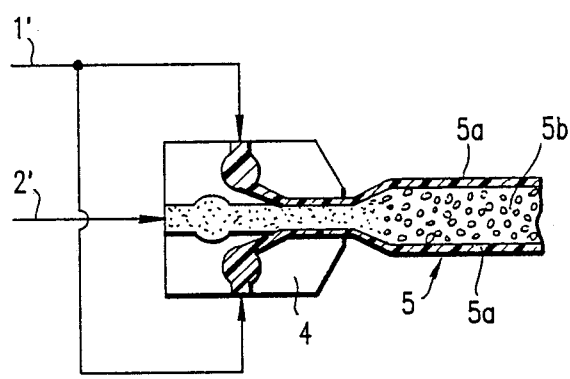

Referring now to the drawings, wherein like reference numerals designate identical or corresponding parts throughout the several views, and more particularly to FIGS. 1a and 1b thereof, the first and second resin compositions 1' and 2' respectively, are melt kneaded in the respective extruders 1 and 2 and then laminated in a T die 4. Extrusion molding from the T die 4 gives a foamed thermoplastic resin article 5 with an unfoamed layer 5a and a foamed layer 5b.

Figure 2A:
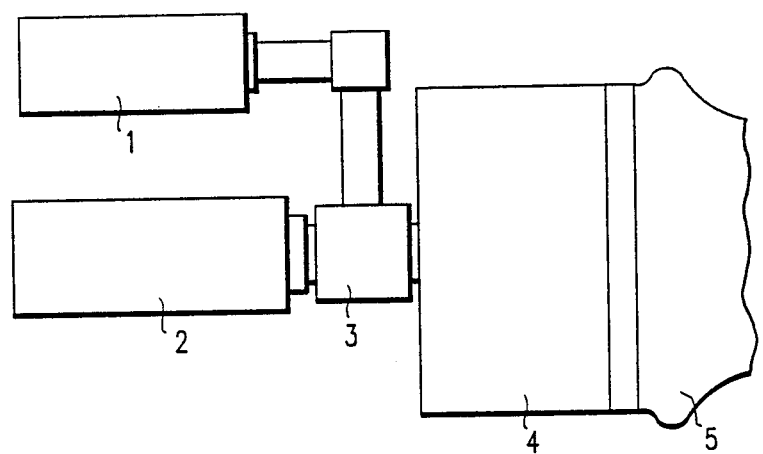
FIGS. 2a and 2b represent an apparatus for extrusion molding while forming a laminate before introduction into a T die.
Figure 2B:
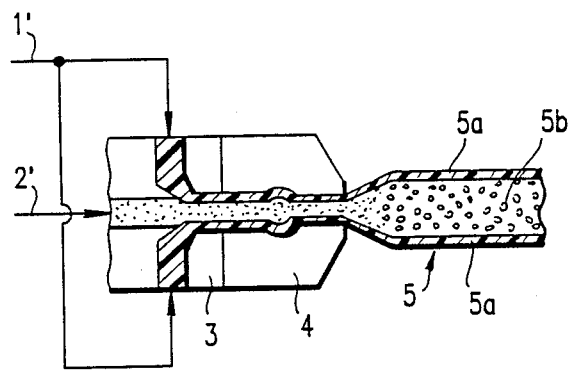

An apparatus for an alternative process in which the lamination is carried out prior to introduction into the T die is shown in FIGS. 2a and 2b. The first and second thermoplastic resin compositions, 1' and 2', respectively, are melt kneaded in the respective extruders 1 and 2 and then laminated in a feed block 3 prior to introduction into a T die 4. Extrusion molding from the T die 4 gives a foamed thermoplastic resin article 5, with an unfoamed layer 5a and a foamed layer 5b.

In a case where other layers are laminated on the laminate of the first and second thermoplastic resin compositions, lamination methods commonly used, such as dry lamination, wet lamination, extrusion lamination, coextrusion lamination and pressing, can be employed.

In accordance with the present invention, the following effects can be obtained.

(1) Since the first thermoplastic resin composition constituting an unfoamed layer contains a filler, it provides a high specific modulus and a high flexural stress to the surface of the foamed article after extrusion molding.

(2) Since the first and second thermoplastic resin compositions are laminated before the extrusion molding through a T die, that is, prior to the formation of the wave-like deformation, when the foamed article are extruded through the T die, the deformation due to expansion in the width direction of the foamed layer is absorbed by the unfoamed layer.

(3) Since there is the unfoamed layer, the dissipation of foaming gas from the foamed layer at the time of extrusion under atmospheric pressure is decreased and thus the ratio of expansion of the foamed layer can be increased.

The present invention will be explained in greater detail with reference to the following examples, but the present invention should not be construed as being limited thereto.

EXAMPLE 1

100 parts by weight of propylene-ethylene block copolymer (melt index: 1.8 g/10 min, "Mitsubishi Polypro BC8") and 10 parts by weight of talc as a filler were compounded to prepare a first thermoplastic resin composition. Independently, 100 parts by weight of propylene-ethylene block copolymer (melt index: 0.5 g/10 min, "Mitsubishi Polypro EC9") and 2.7 parts by weight of a 1:1 mixture of monosodium citrate and sodium hydrogencarbonate as a foaming agent were compounded to prepare a second thermoplastic resin composition. These resin compositions were melt kneaded in the respective extruders and then laminated in a three-layer structure by the feed block method just before introduction into a T die, which was then extruded through the T die and cooled.

The extruder used for the first thermoplastic resin composition had a diameter of 90 mm, the extruder used for the second thermoplastic resin composition had a diameter of 65 mm, and the width of the T die was 750 mm.

In the three-layer laminate made of two type of resin compositions obtained above, the thickness of the layer of the first thermoplastic resin composition as the uppermost layer was 0.3 mm, that of the layer of the second thermoplastic resin composition as the intermediate layer was 1.9 mm, and that of the layer of the first thermoplastic resin composition as the lowermost layer was 0.3 mm. Cooling of the foamed article was performed by the use of three metallic rolls.

Evaluation results in connection with corrugation and appearance of the foamed thermoplastic resin article obtained are shown in Table 1.

EXAMPLE 2

The procedure of Example 1 was repeated with the exception that the amount of talc compounded in the first thermoplastic resin composition was changed to 100 parts by weight.

Evaluation results of the foamed article obtained are shown in Table 1.

COMPARATIVE EXAMPLE 1

The procedure of Example 1 was repeated with the exception that the layer of the first thermoplastic resin composition was not laminated.

Evaluation results of the foamed article obtained are shown in Table 1.

COMPARATIVE EXAMPLE 2

The procedure of Example 1 was repeated with the exception that the filler was not compounded to the first thermoplastic resin composition.

Evaluation results of the foamed article obtained are shown in Table 1.

EXAMPLE 3

The procedure of Example 1 was repeated with the exception that as the second thermoplastic resin, high density polyethylene (melt index: 0.8 g/10 min, "Mitsubishi Polyethy EY40") was used, and as the filler for the first thermoplastic resin composition, 50 parts by weight of talc was compounded.

Evaluation results of the foamed article obtained are shown in Table 1.

COMPARATIVE EXAMPLE 3

The procedure of Example 3 was repeated with the exception that the layer of the first thermoplastic resin composition was not laminated.

Evaluation results of the foamed article obtained are shown in Table 1.

As apparent from the results of Table 1, the foamed articles obtained in the Examples are free of corrugation, and have a good appearance, and further have expansion ratios higher than those in Comparative Examples.

EXAMPLE 4

The procedure of Example 1 was repeated with the exception that as the first thermoplastic resin, high density polyethylene (melt index: 0.25 g/10 min, "Mitsubishi Polyethy BZ50A") was used, and as the filler, 200 parts by weight of calcium carbonate was compounded for the first thermoplastic resin composition, and as the second thermoplastic resin, the above high density polyethylene was used.

Evaluation results of the foamed article obtained are shown in Table 2.

COMPARATIVE EXAMPLE 4

The procedure of Example 4 was repeated with the exception that the filler was not compounded to the first thermoplastic resin composition.

Evaluation results of the foamed article obtained are shown in Table 2.

EXAMPLE 5

The procedure of Example 1 was repeated with the exception that as the filler for the first thermoplastic resin composition, 30 parts by weight of mica was compounded.

Evaluation results of the foamed article obtained are shown in Table 2.

EXAMPLE 6

The procedure of Example 1 was repeated with the exception that as the first thermoplastic resin, ABS resin (melt index at 220° C., 10 kg weight: 9.5 g/10 min, "TUFREX TFX-665" produced by Mitsubishi Monsanto Chemical Co.) was used, and as the filler, 50 parts by weight of talc was compounded for the first thermoplastic resin composition, and as the second thermoplastic resin, polystyrene (melt index at 200° C., 5 kg weight: 2.2 g/10 min, "DIAREX HT516" produced by Mitsubishi Monsanto Chemical Co.) was used, and as the foaming agent, 6 parts by weight of azodicarbonamide was compounded for the second thermoplastic resin composition.

Evaluation results of the foamed article obtained are shown in Table 2.

COMPARATIVE EXAMPLE 5

The procedure of Example 6 was repeated with the exception that the filler was not compounded to the first thermoplastic resin composition.

Evaluation results of the foamed article obtained are shown in Table 2.

TABLE 1

| | Composition (parts by weight) | | | Thickness of Each Layer (Total | | | |
|---|---|---|---|---|---|---|---|
| | Unfoamed Layer | Foamed Layer | Structure of Layers | Thickness) (mm) | Expansion Ratio | Wave-like deformation | Appearance |
| Example 1 | PP 100 Talc 10 | PP 100 Foaming agent 2.7 | 2 types 3 layers | 0.3/1.9/0.3 (2.5) | 2.1 | O | O |
| Example 2 | PP 100 Talc 100 | PP 100 Foaming agent 2.7 | 2 types 3 layers | 0.3/1.9/0.3 (2.5) | 1.9 | O | O |
| Comparative Example 1 | — | PP 100 Foaming agent 2.7 | single layer | (2.5) | 1.4 | X | X |
| Comparative Example 2 | PP 100 | PP 100 Foaming agent 2.7 | 2 types 3 layers | 0.3/1.9/0.3 (2.5) | 2.0 | Δ | Δ |
| Example 3 | PP 100 Talc 50 | HDPE 100 Foaming agent 2.7 | 2 types 3 layers | 0.3/1.9/0.3 (2.5) | 2.1 | O | O |
| Comparative Example 3 | — | HDPE 100 Foaming agent 2.7 | single layer | (2.5) | 1.4 | X | X |

TABLE 2

| | Composition (parts of weight) | | | Thickness of Each Layer (Total | | | |
|---|---|---|---|---|---|---|---|
| | Unfoamed Layer | Foamed Layer | Structure of Layers | Thickness) (mm) | Expansion Ratio | Wave-like deformation | Appearance |
| Example 4 | HDPE 100 Calcium carbonate 200 | HDPE 100 Foaming agent 2.7 | 2 types 3 layers | 0.3/1.9/0.3 (2.5) | 2.3 | O | O |
| Comparative Example 4 | HDPE 100 | HDPE 100 Foaming agent 2.7 | 2 types 3 layers | 0.3/1.9/0.3 (2.5) | 1.5 | X | X |
| Example 5 | PP 100 Mica 30 | PP 100 Foaming agent 2.7 | 2 types 3 layers | 0.3/1.9/0.3 (2.5) | 2.1 | O | O |
| Example 6 | ABS 100 Talc 50 | PS 100 Foaming agent 6 | 2 types 3 layers | 0.3/1.9/0.3 (2.5) | 5.1 | O | O |
| Comparative Example 5 | ABS 100 | PS 100 Foaming agent 6 | 2 types 3 layers | 0.3/1.9/0.3 (2.5) | 2.3 | X | X |

O: No Wave-like deformation occurs, and appearance is good.
Δ: Wave-like deformation partially occurs in the width direction, and longitudinal streaks are formed.
X: Wave-like deformation occurs over the entire width, and the appearance is bad.

As described above, in accordance with the present invention, the first thermoplastic resin composition containing a filler and the second thermoplastic resin composition containing a foaming agent are extrusion molded in the form of laminate. Thus there can be obtained a foamed thermoplastic resin article which is free from the wave-like deformation and has a smooth surface and a good appearance, and further has a high specific modulus and a high flexural stress, and a high expansion ratio. In particular, when the expansion ratio of the foamed layer is up to 10 times, the effects as described above are remarkable.

While the invention has been described in detail and with reference to specific embodiments thereof, it will be apparent to one skilled in the art that various changes and modifications can be made therein without departing from the spirit and scope thereof.

What is claimed is:

1. A process for producing a foamed thermoplastic resin article which comprises separately melt kneading the first thermoplastic resin composition comprising a first thermoplastic resin and 10 to 400 parts by weight per 100 parts by weight of the first thermoplastic resin of a filler and constituting an unfoamed layer at the time of extrusion molding, and the second thermoplastic resin composition comprising a second thermoplastic resin and a foaming agent and constituting a foamed layer at the time of extrusion molding, by the use of extruders, and coextruding the two resin compositions in the form of laminate through a T die.

2. The process as claimed in claim 1, wherein the structure of the laminate is an unfoamed layer/a foamed layer/an unfoamed layer.

3. The process as claimed in claim 1, wherein the thickness ratio of the unfoamed layer is 0.05/1 to 0.7/1 based on the total thickness.

4. The process as claimed in claim 1, wherein the expansion ratio of the foamed layer is up to 10 times.

5. The process as claimed in claim 1, wherein the first and second thermoplastic resin compositions are laminated in a T die.

6. The process as claimed in claim 1, wherein the first and second thermoplastic resin compositions are laminated prior to introduction into the T die.

7. The process as claimed in claim 1, wherein the first and second thermoplastic resins are each a polyolefin resin.

8. The process as claimed in claim 7, wherein the first and second thermoplastic resins are each a polypropylene resin or a high density polyethylene resin.

9. The process as claimed in claim 1, wherein the first and second thermoplastic resins are each a styrene-series resin.

10. The process as claimed in claim 9, wherein the first and second thermoplastic resins are each a polystyrene resin or an ABS resin.

11. The process as claimed in claim 1, wherein the filler is talc, mica or calcium carbonate.

12. The process as claimed in claim 1, wherein the foaming agent is an alkali metal citrate, a mixture of an alkali metal citrate and sodium hydrogencarbonate, or azodicarbonamide.

13. The process as claimed in claim 1, wherein the second thermoplastic resin composition does not substantially contain a filler.

* * * * *